United States Patent
Xing et al.

(10) Patent No.: US 9,342,488 B2
(45) Date of Patent: May 17, 2016

(54) TERMINAL, APPARATUS AND METHOD FOR OPTIMIZING THE DESCRIPTION OF TEXT CONTENTS IN A FIXED LAYOUT DOCUMENT

(71) Applicants: PEKING UNIVERSITY FOUNDER GROUP CO., LTD., Beijing (CN); FOUNDER APABI TECHNOLOGY LIMITED, Beijing (CN)

(72) Inventors: Guofeng Xing, Beijing (CN); Changsheng Wang, Beijing (CN)

(73) Assignees: PEKING UNIVERSITY FOUNDER GROUP CO., LTD., Beijing (CN); FOUNDER APABI TECHNOLOGY LIMITED, Beijing (CN)

( * ) Notice: Subject to any disclaimer, the term of this patent is extended or adjusted under 35 U.S.C. 154(b) by 188 days.

(21) Appl. No.: 14/103,915

(22) Filed: Dec. 12, 2013

(65) Prior Publication Data

US 2014/0351695 A1 Nov. 27, 2014

(30) Foreign Application Priority Data

May 21, 2013 (CN) .......................... 2013 1 0190313

(51) Int. Cl.
*G06F 17/00* (2006.01)
*G06F 17/21* (2006.01)
*G06F 17/22* (2006.01)
*G06K 9/00* (2006.01)

(52) U.S. Cl.
CPC .......... *G06F 17/211* (2013.01); *G06F 17/2264* (2013.01); *G06K 9/00456* (2013.01)

(58) Field of Classification Search
CPC ............................. G06F 17/211; G06F 17/212
See application file for complete search history.

(56) References Cited

U.S. PATENT DOCUMENTS

| 6,047,277 | A  | * | 4/2000  | Parry et al. ...................... 706/20 |
| 6,175,843 | B1 | * | 1/2001  | Muramoto et al. ............ 715/236 |
| 6,279,017 | B1 | * | 8/2001  | Walker .......................... 715/201 |
| 7,168,037 | B2 | * | 1/2007  | Shade et al. ................... 715/244 |
| 7,346,844 | B1 | * | 3/2008  | Baer et al. ..................... 715/708 |
| 7,669,183 | B2 | * | 2/2010  | Bowman et al. .............. 717/113 |
| 7,783,969 | B1 | * | 8/2010  | Menninga ..................... 715/245 |
| 2004/0025118 | A1 | * | 2/2004 | Renner ........................ 715/542 |
| 2005/0154690 | A1 | * | 7/2005 | Nitta et al. ...................... 706/46 |
| 2006/0106837 | A1 | * | 5/2006 | Choi ............................. 707/101 |
| 2007/0226615 | A1 | * | 9/2007 | Johnson et al. ............... 715/531 |
| 2011/0276877 | A1 | * | 11/2011 | Troyansky et al. ........... 715/257 |
| 2012/0109637 | A1 | * | 5/2012 | Merugu et al. .................... 704/9 |
| 2013/0067319 | A1 | * | 3/2013 | Olszewski et al. ............ 715/234 |
| 2013/0138425 | A1 | * | 5/2013 | Luke ................................ 704/9 |

* cited by examiner

*Primary Examiner* — Laurie Ries

(74) *Attorney, Agent, or Firm* — Brinks Gilson & Lione

(57) ABSTRACT

Apparatus for optimizing the description of contents in a layout document is disclosed. The apparatus comprises: a parsing unit, for parsing the content of an original layout document to obtain text graphic unit data; an identification unit, for identifying text properties of each character of the text graphic unit data; a text node classification unit, for classifying characters of the text graphic unit data according to the text properties, and saving characters with the same text properties to the same text node along with the same text properties; a text content node classification unit, for, with respect to characters saved in each text node, saving characters on the same line or column. A terminal and a method for optimizing the description of contents in a layout document are disclosed.

18 Claims, 7 Drawing Sheets

TERMINAL, APPARATUS AND METHOD FOR OPTIMIZING THE DESCRIPTION OF TEXT CONTENTS IN A FIXED LAYOUT DOCUMENT

CROSS-REFERENCE TO RELATED APPLICATIONS

This application claims priority to Chinese Patent Application No. 201310190313.3, filed on May 21, 2013 and entitled "TERMINAL, APPARATUS AND METHOD FOR OPTIMIZING THE DESCRIPTION OF TEXT CONTENTS INA FIXED-LAYOUT DOCUMENT", which is incorporated herein by reference in its entirety.

FIELD OF THE INVENTION

The present invention relates to the field of computer techniques, and more particular, to an apparatus for optimizing the description of text contents in a fixed-layout document, a terminal having the apparatus for optimizing the description of text contents in a fixed-layout document and a method for optimizing the description of text contents in a fixed-layout document.

DESCRIPTION OF THE RELATED ART

As for content of layout documents, text is an important portion. Text content of layout documents may be described in different ways, with different parsing efficiencies, display effects and document sizes. One of the simplest methods of saving text content in layout documents is to directly save coordinates and text information of each character. Such method is simple for implementation and convenient for saving. However, a layout document may have a large amount of text data contained therein, saving text content in this way may produce a large amount of data to save correspondingly coordinates and text information, resulting to a large quantity of redundant information in the description of text content and thus increased document size.

Thus, a technique for description of contents in a layout document that is simple and capable of reducing document size is desired.

SUMMARY OF THE INVENTION

In view of technical problems in related techniques, a technical problem to be addressed in this invention is to provide a technique for optimizing the description of contents in a layout document, which may describe text content as much as possible with as few data as possible, to reduce sizes of layout documents.

According to an aspect of this invention, an apparatus for optimizing the description of contents in a layout document, comprising: a parsing unit, for parsing the content of an original layout document to obtain text graphic unit data (i.e. data of graphic unit for text); an identification unit, for identifying text properties of each character of the text graphic unit data; a text node classification unit, for classifying characters of the text graphic unit data according to the text properties, and saving characters with the same text properties to the same text node along with the same text properties; a text content node classification unit, for, with respect to characters saved in each text node, saving characters on the same line or column, the coordinates of an initial character on the same line or column, average character spacing of the same line or column to a text content node to obtain optimized contents in the layout document, wherein the text content node is a text content node under the text node and corresponding to the same line or column.

characters having the same text property are saved into the same text node, and the corresponding text property is saved in the text node also; characters having the same text property and on the same line/column are saved in the same text content node, and layout location information of multiple characters is represented with coordinates of an initial character in conjunction with character spacing, to simplify the description of text content of the layout document, reduce redundancy in text description data, and thereby reduce the size of the layout document.

In the above technical solution, preferably, the text node classification unit comprises: a first determination subunit, for determining whether a present character has the same text properties as an adjacent character with respect to characters on each line or column of the text graphic unit data, wherein when the determination result of the first determination subunit is Yes, the text node classification unit saves the present character into a text node corresponding to the adjacent character.

In the creation of a text node, which text property a character of the text graphic unit data belongs to is determined based on each character to classify characters having the same text property into the same text node. If there are eight text properties, eight text nodes are created for the text graphic unit data.

In the above technical solution, preferably, the text node classification unit further comprise: a first creation subunit, for creating a new text node when the determination result is No, and saving the present character into the newly created text node.

In the above technical solution, preferably, the text content node classification unit comprises: a calculation subunit, for buffering characters belonging to the same line or column with respect to a character of each text node, and calculating average character spacing and actual character spacing for the characters on the same line or column; a second determination subunit, for adding characters successively determined and having a difference between the actual character spacing and the average character spacing that is less than or equal to a predetermined value into the text content node, and saving the average character spacing and coordinates of the first character added to the text content node to the text content node; a second creation subunit, for adding characters having a difference between the actual character spacing and the average character spacing that is larger than the predetermined value to a newly crated text content node corresponding to the same line or column.

After text node creation, text content node classification is performed for each text node. In the text content node classification, at first, an analysis is performed to determine characters of the text node that belong to the same line or column, then an average character spacing is calculated for this line or column, to put characters having actual character spacing close or equal to the average character spacing into a text content node corresponding to this line or column, and add remaining characters on this line or column to a newly created text content node. Thus, for each text node, characters of the text node are divided into one or more text content nodes according to actual character spacing, each text content node having coordinates of its initial character and character spacing saved therein. Thus, the coordinates of each character may be determined for every text content node, without saving text properties and coordinates for each character. Thus redundant information may be reduced greatly, leading to a decreased size of the document.

In any above technical solution, preferably, the text properties comprise a font name, a font size and/or a font color.

According to another aspect of this invention, a terminal is further provided, comprising the apparatus for optimizing the description of contents in a layout document in any above technical solution, and further comprising: a display unit, for when displaying contents in a layout document that have been optimized by the apparatus for optimizing the description of contents in a layout document, determining a display location as well as text properties to be displayed for each character of the contents in the layout document, based on the text properties of the text node, and average character spacing and coordinates of an initial character of a line or column in each text content node under the text node.

When displaying text content, characters of each text content node under the same text node are displayed according to a text property of the text node. Based on coordinates of an initial character and character spacing saved in the text content node, locations of remaining characters may be derived to display the text content properly.

According to another aspect of this invention, a method for optimizing the description of contents in a layout document is further provided, comprising: parsing the content of an original layout document to obtain text graphic unit data; identifying text properties of each character of the text graphic unit data, and classifying characters of the text graphic unit data according to the text properties, to save characters with the same text properties to the same text node along with the same text properties; for characters saved in each text node, saving characters on the same line or column, coordinates of an initial character on the same line or column, average character spacing of the same line or column to a text content node to obtain optimized contents in the layout document, wherein the text content node is a text content node under the text node and corresponding to the same line or column.

characters having the same text property are saved into the same text node, and the corresponding text property is saved in the text node also; characters having the same text property and on the same line or column are saved in the same text content node, and layout location information of multiple characters is represented with coordinates of an initial character in conjunction with average character spacing, to simplify the representation of text content of the layout document, reduce redundancy in text representation data, and thereby reduce the size of the layout document.

In the above technical solution, preferably, the character classification method may comprise: determining whether a present character has the same text properties as an adjacent character for characters on each line or column of the text graphic unit data, saving the present character into a text node corresponding to the adjacent character when the determination result is Yes.

In the creation of a text node, which text property a character of the text graphic unit data belongs to is determined based on each character to classify characters having the same text property into the same text node. If there are eight text properties, eight text nodes are created for the text graphic unit data.

In the above technical solution, preferably, when the determination result is No, a new text node is created, and the present character is saved into the newly created text node.

In the above technical solution, preferably, the creation method of the text content node comprises: buffering characters belonging to the same line or column for characters of each text node, calculating an average character spacing and actual character spacing among characters on the same line or column; adding characters successively determined and having a difference between the actual character spacing and the average character spacing that is less than or equal to a predetermined value into the text content node, and saving the average character spacing and coordinates of the first character added to the text content node to the text content node; adding characters having a difference between the actual character spacing and the average character spacing that is larger than the predetermined value to a newly created text content node corresponding to the same line or column.

After text node creation, text content node classification is performed for each text node. In the text content node classification, at first, an analysis is performed to determine characters of the text node that belong to the same line or column, then average character spacing is calculated for this line or column, to put characters having actual character spacing close to or equal to the average character spacing into a text content node corresponding to this line or column, and add remaining characters on this line or column to a newly created text content node. Thus, for each text node, characters of the text node are divided into one or more text content nodes according to actual character spacing, each text content node having coordinates of its initial character and character spacing saved therein. Thus, the coordinates of each character may be determined for every text content node, without saving text properties and coordinates for each character. Thus redundant information may be reduced greatly, leading to a decreased size of the document.

In any above technical solution, preferably, the text properties comprise the text properties comprise a font name, a font size and/or a font color.

In any above technical solution, preferably, when displaying optimized contents in the layout document, determining a display location as well as text properties to be displayed for each character of the contents in the layout document, based on the text properties of the text node, and average character spacing and coordinates of an initial character of a line or column in each text content node under the text node.

When displaying text content, characters of each text content node under the same text node are displayed according to a text property of the text node. Based on coordinates of an initial character and character spacing saved in the textCode node, locations of remaining characters may be derived to display the text content properly.

DESCRIPTION OF THE EMBODIMENTS

For a more distinct understanding of the above objects, features and advantageous of this invention, it will be described in a further detail with reference to drawings and particular embodiments below. It should be noticed that, in the case of no conflicts, embodiments and features of embodiments of this invention may be combined with each other.

Many details will be set forth in the following description to achieve a throughout understanding of this invention, however, this invention may be implemented in other ways different from that disclosed herein, and therefore is not limited to the particular embodiments disclosed below.

Figure 1:
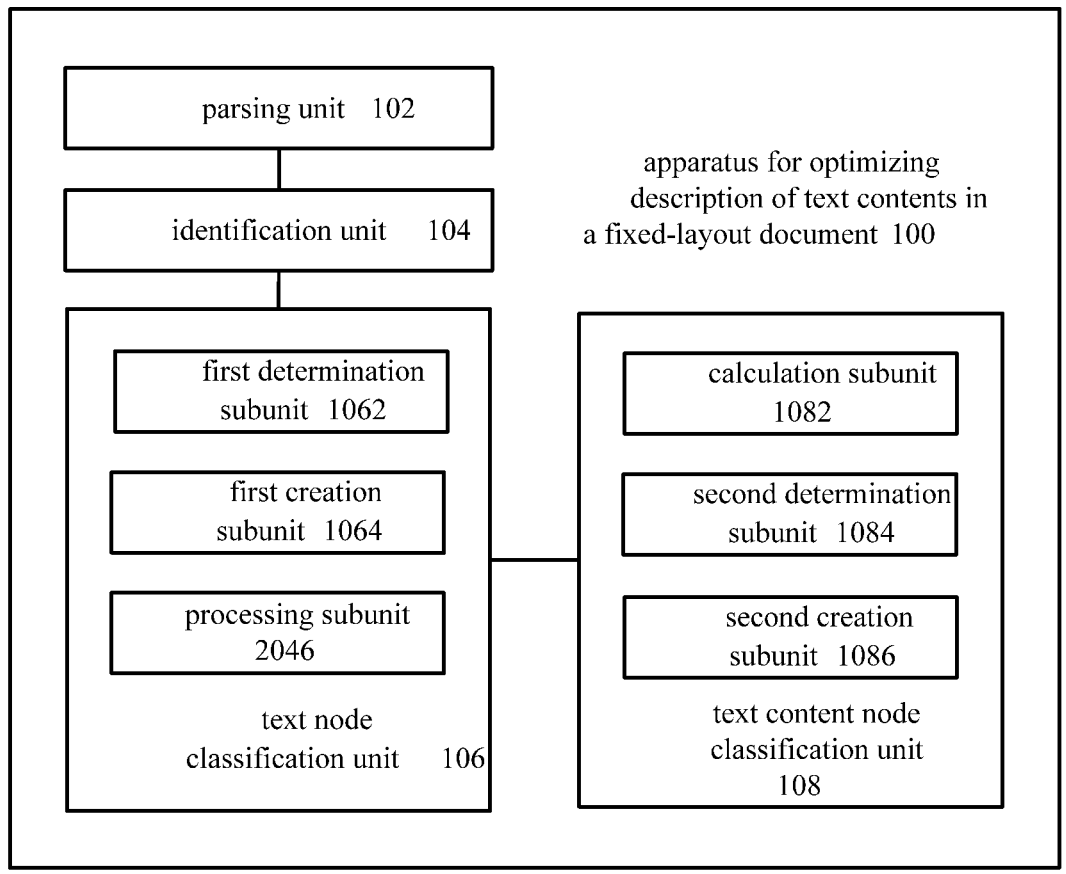
FIG. 1 shows a block diagram of an apparatus for optimizing the description of contents in a layout document according to an embodiment of this invention.

FIG. 1 shows a block diagram of an apparatus for optimizing the description of contents in a layout document according to an embodiment of this invention.

As shown in FIG. 1, the apparatus 100 for optimizing the description of contents in a layout document according to an embodiment of this invention comprises: a parsing unit 102, for parsing the content of an original layout document to obtain text graphic unit data; an identification unit 104, for identifying text properties of each character of the text graphic unit data; a text node classification unit 106, for classifying characters of the text graphic unit data according to their text properties, to save characters with the same text property to the same text node along with the same text property; a text content node classification unit 108, for, with respect to characters saved in each text node, saving characters on the same line or column, the coordinates of an initial character on the same line or column, average character spacing of the same line or column to a text content node to obtain optimized contents in a layout document, wherein the text content node is a text content node under the text node and corresponding to the same line or column.

characters having the same text property are saved into the same text node, and the corresponding text property is also saved in the text node; characters having the same text property and on the same line or column are saved in the same text content node, and layout location information of multiple characters is represented with coordinates of an initial character in conjunction with average character spacing, to simplify the description of text content of the layout document, reduce redundancy in text description data, and thereby reduce the size of the layout document.

In the above technical solution, preferably, the text node classification unit 106 comprises: a first determination subunit 1062, for with respect to characters on each line or column of the text graphic unit data, determining whether a present character has the same text property as an adjacent character, wherein when the determination result of the first determination subunit 1062 is Yes, the text node classification unit saves the present character into a text node corresponding to the adjacent character.

In the creation of a text node, which text property a character of the text graphic unit data belongs to is determined for each character to classify characters having the same text property into the same text node. If there are eight text properties, eight text nodes are created for the text graphic unit data.

In the above technical solution, preferably, the text node classification unit 106 may further comprise: a first creation subunit 1064, for when the determination result is No, creating a new text node, and saving the present character into the newly created text node.

In the above technical solution, preferably, the text content node classification unit 108 comprises: a calculation subunit 1082, for with respect to characters of the each text node, buffering characters belonging to the same line or column, calculating average character spacing and actual character spacing for adjacent characters on the same line or column; a second determination subunit 1084, for adding characters continuously determined and having a difference of the actual character spacing and the average character spacing that is less than or equal to a predetermined value into the text content node, and saving the average character spacing and coordinates of the first character added to the text content node to the text content node; a second creation subunit 1086, for adding characters having a difference between the actual character spacing and the average character spacing that is larger than the predetermined value to a newly created text content node corresponding to the same line or column.

After text node creation, text content node classification is performed for each text node. In the text content node classification, at first, an analysis is performed to determine characters of the text node that belong to the same line or column, then average character spacing is calculated for this line or column, to put characters of this line or column having actual character spacing close or equal to the average character spacing into a text content node corresponding to this line or column, and add remaining characters on this line or column to a newly created text content node. Thus, for each text node, characters of the text node are distributed into one or more text content nodes according to character spacing, with each text content node having coordinates of the initial character and character spacing saved therein. Thus, the coordinates of each character for each text content node may be determined, without saving text properties and coordinates for each character. Thus redundant information may be reduced greatly, leading to a decreased size of the document.

In any above technical solution, preferably, the text properties comprise font names, font sizes and/or font colors.

Figure 2:
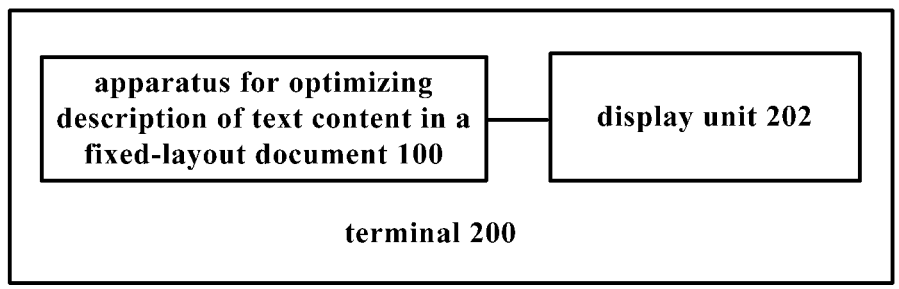
FIG. 2 shows a schematic diagram of a terminal according to an embodiment of this invention.

FIG. 2 shows a schematic diagram of a terminal according to an embodiment of this invention.

As shown in FIG. 2, a terminal 200 according to an embodiment of this invention comprises the apparatus 100 for optimizing the description of contents in a layout document in any above technical solution, and may further comprise: a display unit 202, for determining a display location, as well as a text property to be displayed, for each character of the contents in a layout document, when displaying contents in a layout document that has been optimized by the apparatus for optimizing the description of contents in a layout document, based on text property of a text node and average character spacing and coordinates of an initial character of a line or column of each text content node under the text node.

When displaying document content, characters of each text content node under the same text node are displayed according to a text property of the text node. Based on coordinates of an initial character and character spacing saved in the text content node, locations of remaining characters may be derived to display the document content properly.

Figure 3:
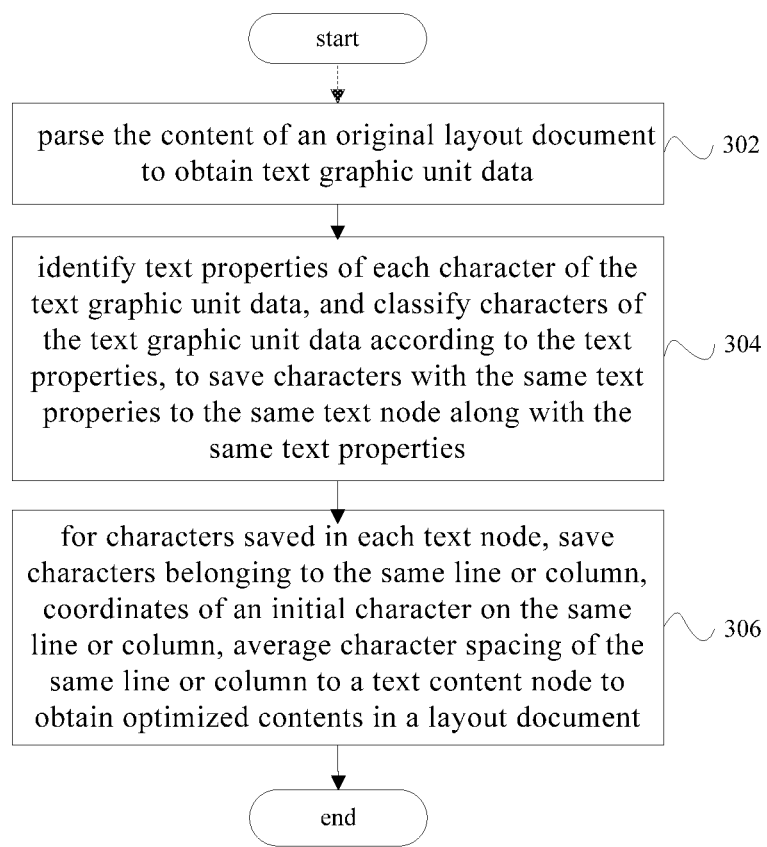
FIG. 3 shows a flowchart of a method for optimizing the description of contents in a layout document according to an embodiment of this invention.

FIG. 3 shows a flowchart of a method for optimizing the description of contents in a layout document according to an embodiment of this invention.

As shown in FIG. 3, a method for optimizing the description of contents in a layout document according to an embodiment of this invention may comprise the following steps.

At step 302, text graphic unit data is obtained by parsing the content of an original layout document; at step 304, text properties of each character of the text graphic unit data are identified, and characters of the text graphic unit data are classified according to their text properties, to save characters with the same text property to the same text node along with the same text property; at step 306, for characters saved in each text node, characters belonging to the same line or column, coordinates of an initial character on the same line or column, average character spacing of the same line or column are saved to a text content node to obtain optimized contents of the layout document, wherein the text content node is a text content node under the text node and corresponding to the same line or column.

characters having the same text property are saved into the same text node, and the corresponding text property is also saved in the text node; characters having the same text property and on the same line or column are saved in the same text content node, and layout location information of multiple characters is represented with coordinates of an initial character in conjunction with average character spacing, to simplify the description of text content of the layout document, reduce redundancy in text description data, and thereby reduce the size of the layout document.

At step 304, the character classification method may comprise: for characters on each line or column of the text graphic unit data, determining whether a present character has the same text property as an adjacent character. When the determination result is Yes, the present character is saved into a text node corresponding to the adjacent character.

In the creation of a text node, which text property a character of the text graphic unit data belongs to is determined based on each character to classify characters having the same text property into the same text node. If there are eight text properties, eight text nodes are created for the text graphic unit data.

In the above technical solution, preferably, when the determination result is No, a new text node is created, and the present character is saved into the newly created text node.

At step 306, the method of creating the text content node comprises: for characters of the each text node, buffering characters belonging to the same line or column, calculating average character spacing and actual character spacing for adjacent characters on the same line or column; adding characters successively determined and having a difference between the actual character spacing and the average character spacing that is less than or equal to a predetermined value into the text content node, and saving the coordinates of the first character added to the text content node to the text content node; adding characters having a difference between the actual character spacing and the average character spacing that is larger than the predetermined value to a newly created text content node corresponding to the same line or column.

After text node creation, text content node classification is performed for each text node. In the text content node classification, at first, an analysis is performed to determine characters of the text node that belong to the same line or column, then average character spacing is calculated for this line or column, to put characters of this line or column having actual character spacing close to or equal to the average character spacing into a text content node corresponding to this line or column, and add remaining characters on this line or column to a newly created text content node. Thus, for each text node, characters of the text node are distributed into one or more text content nodes according to character spacing, with each text content node having coordinates of the initial character and character spacing saved therein. Thus, the coordinates of each character may be determined for every text content node, without saving text properties and coordinates for each character. Thus redundant information may be reduced greatly, leading to a decreased size of the document.

In any above technical solution, preferably, the text properties comprise font names, font sizes and/or font colors.

In any above technical solution, preferably, when displaying optimized contents in a layout document, based on the text property of the text node, and average character spacing and coordinates of an initial character on a line or column in each text content node under the text node, a display location, as well as a text property to be displayed, is determined for each character of the contents in a layout document.

When displaying document content, characters of each text content node under the same text node are displayed according to a text property of the text node. Based on coordinates of an initial character and character spacing saved in the text content node, locations of remaining characters may be derived to display the document content properly.

Figure 4:
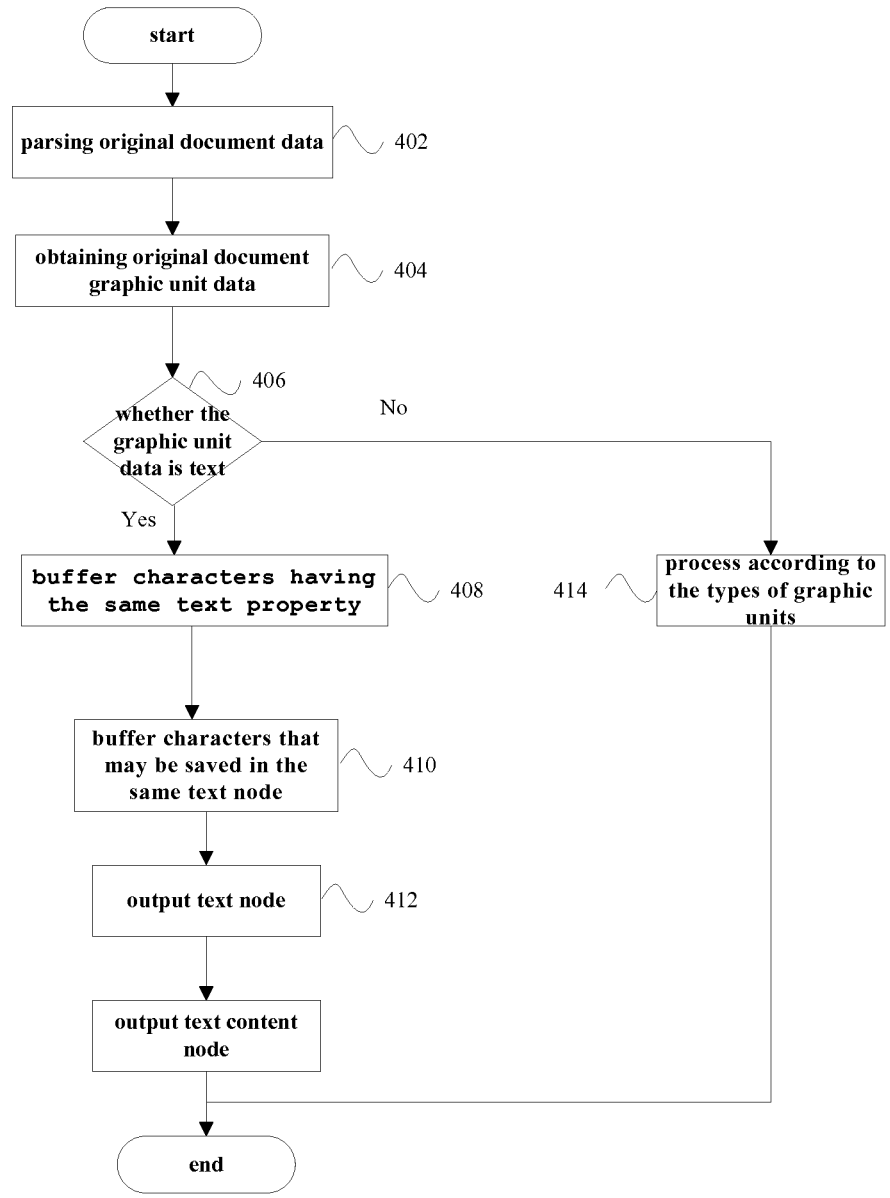
FIG. 4 shows a flowchart of a method for optimizing the description of contents in a layout document according to another embodiment of this invention.

The method for optimizing the description of contents in a layout document according to an embodiment of this invention will be further described with reference to FIG. 4 to FIG. 7. FIG. 4 shows a flowchart of a method for optimizing the description of contents in a layout document according to another embodiment of this invention.

As shown in FIG. 4, at step 402, content of an original document is parsed using a parse engine. At step 404, graphic unit data of the original document are obtained.

At step 406, it is determined whether the graphic unit data of the original document is text, if so, the process proceeds to step 408; otherwise the process proceeds to step 414 to perform corresponding processes according to graphic unit types.

At step 408, characters having the same text property are buffered. Text properties may comprise: font names, font sizes and/or font colors. Particularly, it is determined whether the text graphic units have the same font, font size, and font color, if so, these characters are saved in the same text node; if the above conditions are not satisfied, they are saved in different text nodes, as illustrated in FIG. 5.

Figure 6:
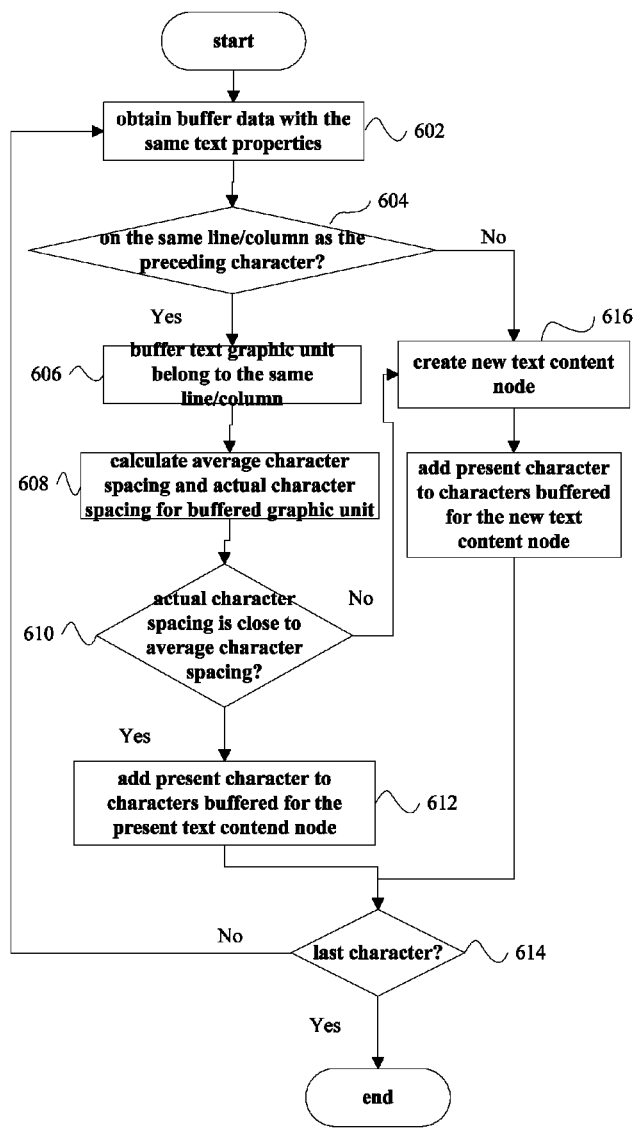
FIG. 6 shows a flowchart of classifying text content nodes according to an embodiment of this invention.

At step 410, characters that may be saved in the same text node are buffered. Particularly, among characters having the same text properties, characters belonging to the same line/column are buffered. Average character spacing and actual character spacing of the buffered characters are calculated to compare the characters' actual character spacing with the average character spacing, taking the average character spacing as a comparison reference. If the error is within an acceptable range, these characters are saved in the same text content node; if the above condition is not satisfied, they are saved indifferent text content nodes, as illustrated in FIG. 6.

At step 412, finally, the text nodes and text content nodes are output by the layout document.

Figure 5:
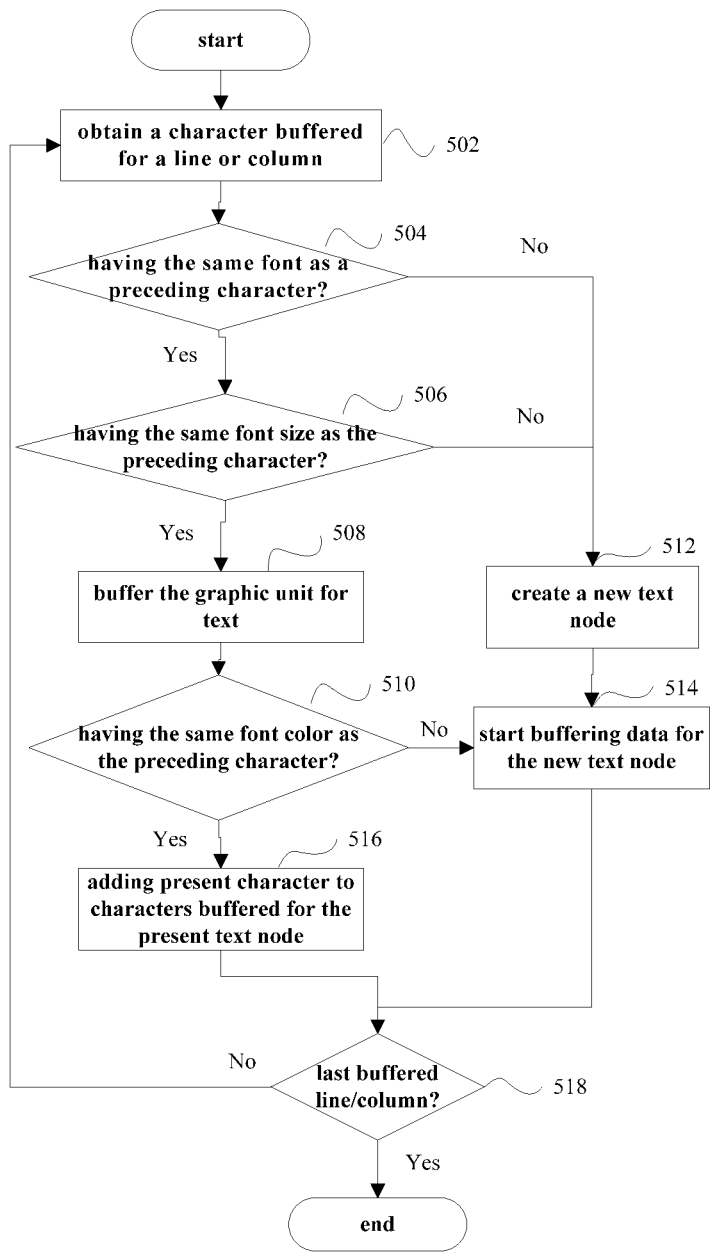
FIG. 5 shows a flowchart of classifying characters according to text properties according to an embodiment of this invention.

FIG. 5 shows a flowchart of classifying characters according to text properties according to an embodiment of this invention.

As shown in FIG. 5, at step 502, a character in a buffered line or column is obtained. At step 504, it is determined whether the present obtained character has the same font as a preceding character. If they have the same font, the process proceeds to step 506; otherwise the process proceeds to step 512.

At step 506, it is determined whether the present obtained character has the same font size as the preceding character, if it has the same font size, the process proceeds to step 508 to buffer this text graphic unit; otherwise, the process proceeds to step 512 to create a new text node.

At step 510, it is determined whether the currently obtained character has the same font color as the preceding character, if they have the same font color, the process proceeds to step 516; otherwise, the process proceeds to step 514 to continue with data buffering for a new text node.

At step 516, the present character is added to characters that are buffered for the present text node.

At step 518, it is determined whether it is the last buffer line or column, if Yes, the process ends; otherwise, the process returns to step 502.

FIG. 6 shows a flowchart of classifying the text content nodes according to an embodiment of this invention.

As shown in FIG. 6, at step 602, buffer data having the same text property is obtained.

At step 604, it is determined whether a present character of the buffer data is on the same line or column as its preceding character, if Yes, the process proceeds to step 606; otherwise, the process proceeds to step 616 to create a new text content node.

At step 606, text graphic units belonging to the same line or column are buffered.

At step 608, average character spacing and actual character spacing are calculated for the buffered text graphic units of the same line or column.

At step 610, it is determined whether the actual character spacing is close to the average character spacing. If Yes, the process proceeds to step 612; if No, the process proceeds to step 616 to create a new text content node, and add the present character to the buffered characters of the new text content node.

At step 612, the present character is added to the buffered characters of the present text content node.

At step 614, it is determined whether the present character is the last character; if Yes, the process ends; otherwise, the process returns to step 602.

Alternatively, in the above step 608, the character spacing between the first and second characters in the buffered graphic units (i.e. at least two characters have been buffered) may be calculated instead of the average character spacing. In this case, in step 610, the character spacing between the first and second characters are compared with the actual character spacing.

In one embodiment of the present invention, when deciding whether the character spacings are close to each other, a threshold may be preset. For example, the threshold may be preset as 0.11 pt. When the difference between the average character spacing (or the character spacing between the first and second characters in the buffered graphic units) and the actual character spacing is smaller or equal to the threshold, it is considered that the character spacings are close. As one skilled in the art may appreciate, the above threshold is just an example, and other threshold may be set. For example, the threshold may be 0.8 pt, 0.5 pt, or 0.2 pt.

Figure 7:
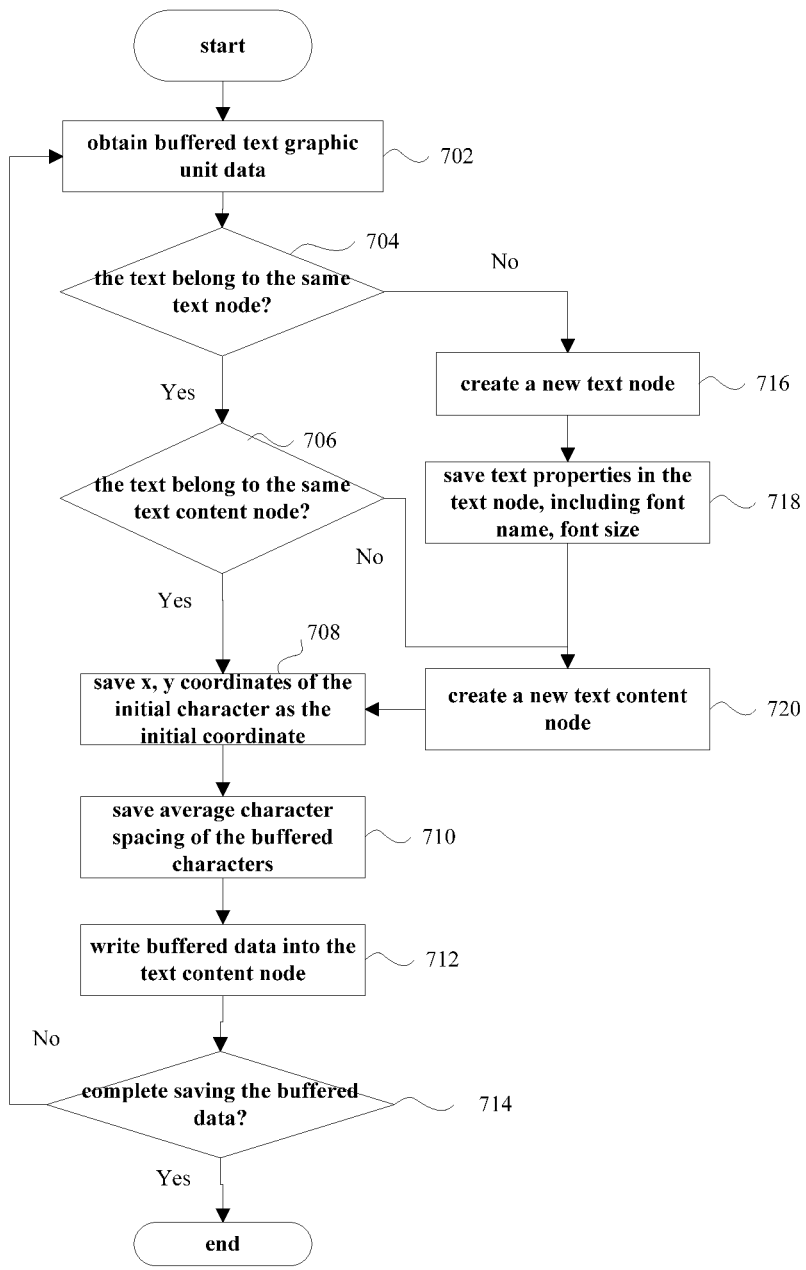
FIG. 7 shows a flowchart of a method of saving contents in a layout document according to an embodiment of this invention.

FIG. 7 shows a flowchart of a method of saving contents in a layout document according to an embodiment of this invention.

As shown in FIG. 7, first, at step 702, text graphic unit data that has been processed and buffered is obtained.

At step 704, it is determined whether text of the text graphic unit data belongs to the same text node, that is, whether characters of the text graphic unit data have the same text properties. If Yes, the process proceeds to step 706; otherwise, the process proceeds to step 716 to create a new text node, and then proceeds to step 718 to save text properties corresponding to the text node in the newly created text node. The text properties include a font name and a font size.

At step 706, it is determined whether the text belongs to the same text content node (based on average character spacing of a buffered line or column), that is, to create a text content node for characters belonging to the same text content node in the text node; if Yes, the process proceeds to step 708; otherwise the process proceeds to step 720 to create a new text content node, and then proceeds to step 708 to save coordinates of an initial character of the text content node, with the coordinates of the character as the initial coordinates of the text content node. Further, character spacing information is saved, with the average character spacing of characters buffered for the same line or column as character spacing. Finally, codes of the characters are saved. At step 712, buffered data is written to the text content node.

At step 714, it is determined whether all buffered data is saved; if Yes, the process ends; otherwise, the process returns to step 702.

Technical solutions according to this invention have been described in detail above with reference to drawings. In related layout documents, there is a large amount of redundant information in the description of its text content. For each character, its coordinates and lots of other text information have to be saved, causing a large amount of redundant data in the layout document and an increased size of the document. In order to address this technical problem, a method for optimizing the description of contents in a layout document is provided in this invention. With this method, characters having the same text property are saved into the same text node, and the text properties are also saved in the text node; characters having the same text properties and on the same line or column are saved in the same text content node, and layout location information of multiple characters is represented with coordinates of an initial character in conjunction with character spacing, to simplify the description of text content of the layout document, and reduce redundancy in text description data, and thereby reduce the size of the layout document.

Figure 8:
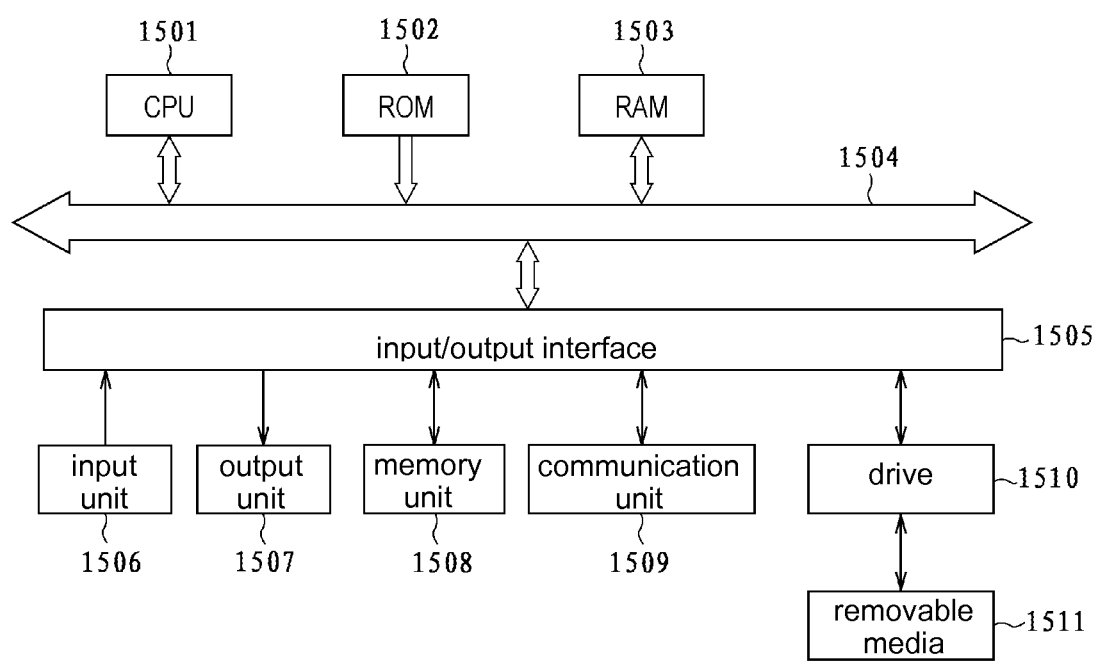
FIG. 8 shows a block diagram of an example of the structure of a computer.

FIG. 8 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

What are described above are merely preferred embodiments of the present invention, but do not limit the protection scope of the present invention. Various modifications or variations can be made to this invention by persons skilled in the art. Any modifications, substitutions, and improvements within the scope and spirit of this invention should be encompassed in the protection scope of this invention.

What is claimed is:

1. An apparatus for optimizing the description of contents in a layout document, the apparatus comprising a processor configured to:
   parse the content of an original layout document to obtain text graphic unit data;
   identify text properties of each character of the text graphic unit data;
   classify characters of the text graphic unit data according to the text properties, and save characters with the same text properties to the same text node along with the same text properties;
   save, with respect to characters saved in each text node, characters on the same line or column, the coordinates of an initial character on the same line or column, average character spacing of the same line or column to a text content node to obtain optimized contents in the layout document,
   wherein the text content node is a text content node under the text node and corresponding to the same line or column.

2. The apparatus of claim 1 wherein the processor is further configured to:
   determined whether a present character has the same text properties as an adjacent character with respect to characters on each line or column of the text graphic unit data, wherein when the determination result is Yes, the present character is saved into a text node corresponding to the adjacent character.

3. The apparatus of claim 2 wherein the processor is further configured to:
   create a new text node when the determination result is No, and save the present character into the newly created text node.

4. The apparatus of claim 1 wherein the processor is further configured to:
   buffer characters belonging to the same line or column with respect to a character of each text node, and calculate average character spacing and actual character spacing for the characters on the same line or column;
   add characters successively determined and having a difference between the actual character spacing and the average character spacing that is less than or equal to a predetermined value into the text content node, and save the average character spacing and coordinates of the first character added to the text content node to the text content node;
   add characters having a difference between the actual character spacing and the average character spacing that is larger than the predetermined value to a newly created text content node corresponding to the same line or column.

5. The apparatus of claim 1 wherein the text properties comprise one of a font name, a font size and/or a font color.

6. The apparatus of claim 1 wherein the terminal comprising an apparatus for optimizing the description of contents in a layout document, the apparatus further comprising:
   a display unit, for when displaying contents in a layout document that have been optimized by the apparatus for optimizing the description of contents in a layout document, determining a display location as well as text properties to be displayed for each character of the contents in the layout document, based on the text properties of the text node, and average character spacing and coordinates of an initial character of a line or column in each text content node under the text node.

7. A method for optimizing the description of contents in a layout document, the method comprising:
   parsing the content of an original layout document to obtain text graphic unit data;
   identifying text properties of each character of the text graphic unit data, and classifying characters of the text graphic unit data according to the text properties, to save characters with the same text properties to the same text node along with the same text properties;
   for characters saved in each text node, saving characters on the same line or column, coordinates of an initial character on the same line or column, average character spacing of the same line or column to a text content node to obtain optimized contents in the layout document,
   wherein the text content node is a text content node under the text node and corresponding to the same line or column.

8. The method of claim 7 wherein classifying the characters comprises:
   determining whether a present character has the same text properties as an adjacent character for characters on each line or column of the text graphic unit data,
   saving the present character into a text node corresponding to the adjacent character when the determination result is Yes.

9. The method of claim 8 wherein when the determination result is No, a new text node is created, and the present character is saved into the newly created text node.

10. The method of claim 7, characterized in that wherein the step of creating the text content node comprises:
    buffering characters belonging to the same line or column for characters of each text node,
    calculating an average character spacing and actual character spacing among characters on the same line or column;
    adding characters successively determined and having a difference between the actual character spacing and the average character spacing that is less than or equal to a predetermined value into the text content node, and saving the average character spacing and coordinates of the first character added to the text content node to the text content node;
    adding characters having a difference between the actual character spacing and the average character spacing that is larger than the predetermined value to a newly created text content node corresponding to the same line or column.

11. The method of claim 7 wherein the text properties comprise a font name, a font size and/or a font color.

12. The method of claim 7 wherein when displaying optimized contents in the layout document, determining a display location as well as text properties to be displayed for each character of the contents in the layout document, based on the text properties of the text node, and average character spacing and coordinates of an initial character of a line or column in each text content node under the text node.

13. A method for optimizing the description of contents in a layout document, the method comprising:
    parsing the content of an original layout document having a document size to obtain text graphic unit data;
    identifying text properties of each character of the text graphic unit data, and classifying characters of the text graphic unit data according to the text properties, to save characters with the same text properties to the same text node along with the same text properties;
    for characters saved in each text node, saving characters on the same line or column, coordinates of an initial character on the same line or column, average character spacing of the same line or column to a text content node to obtain optimized contents in the layout document, wherein the text content node is a text content node under the text node and corresponding to the same line or column; and saving the optimized contents in the layout document on a computer readable medium with a reduced document size compared to the original layout document.

14. The method of claim 13, wherein classifying the characters comprises:

determining whether a present character has the same text properties as an adjacent character for characters on each line or column of the text graphic unit data, saving the present character into a text node corresponding to the adjacent character when the determination result is Yes.

15. The method of claim 14, wherein when the determination result is No, a new text node is created, and the present character is saved into the newly created text node.

16. The method of claim 13, wherein the step of creating the text content node comprises:

buffering characters belonging to the same line or column for characters of each text node, calculating an average character spacing and actual character spacing among characters on the same line or column;

adding characters successively determined and having a difference between the actual character spacing and the average character spacing that is less than or equal to a predetermined value into the text content node, and saving the average character spacing and coordinates of the first character added to the text content node to the text content node;

adding characters having a difference between the actual character spacing and the average character spacing that is larger than the predetermined value to a newly created text content node corresponding to the same line or column.

17. The method of claim 13, wherein the text properties comprise a font name, a font size and/or a font color.

18. The method of claim 13, wherein when displaying optimized contents in the layout document, determining a display location as well as text properties to be displayed for each character of the contents in the layout document, based on the text properties of the text node, and average character spacing and coordinates of an initial character of a line or column in each text content node under the text node.

* * * * *